United States Patent [19]

Indresaeter

[11] 3,974,845

[45] Aug. 17, 1976

[54] SELF-CORRECTING LINEARLY MOVABLE IRRIGATION SYSTEM

[75] Inventor: Harald Indresaeter, Lubbock, Tex.

[73] Assignee: Gifford-Hill & Company, Inc., Lubbock, Tex.

[22] Filed: Sept. 22, 1975

[21] Appl. No.: 615,209

[52] U.S. Cl. .................................... 137/1; 137/344; 239/184
[51] Int. Cl.² ........................ B05B 3/18; E01H 3/02
[58] Field of Search ................ 239/184, 212; 137/1, 137/344

[56] References Cited
UNITED STATES PATENTS

| | | | |
|---|---|---|---|
| 3,608,827 | 9/1971 | Kinkead | 137/344 X |
| 3,613,703 | 10/1971 | Stout | 137/344 X |
| 3,807,436 | 4/1974 | Pringle | 137/344 |

Primary Examiner—Henry T. Klinksiek
Attorney, Agent, or Firm—Bard, Springs & Jackson

[57] ABSTRACT

A linearly movable irrigation system, according to the present invention, may include a plurality of interconnected power driven irrigation sections supporting a water supply conduit which sections are capable of moving over a land area and depositing a controlled amount of water thereon. At one extremity of the irrigation system may be provided a mobile power and control unit that accepts water from a water supply system and conducts it to the overhead irrigation pipe under sufficient pressure to cause proper distribution of water through sprinkler devices located along the length of the irrigation conduit. A power driven pump may be supported by the power and control unit in order to pressurize or provide boosting pressure for the water received from the water supply. The power and control unit is adapted to move in proximity to an elongated reference which may be straight or curved as desired. The power and control unit is provided with means for sensing linear displacement and angular relationship thereof relative to the reference and for inducing control signals to the irrigation system that maintains linear displacement and angular misalignment of the system within an acceptable range. Each extremity of the irrigation system may remain static while the other moves or while interior sections thereof move in order to maintain movement of the irrigation system along a substantially linear track. The extremities of the irrigation system may also move simultaneously at equal speeds or at different speeds to accomplish controlled movement during irrigation operations.

20 Claims, 14 Drawing Figures

FIG. 6
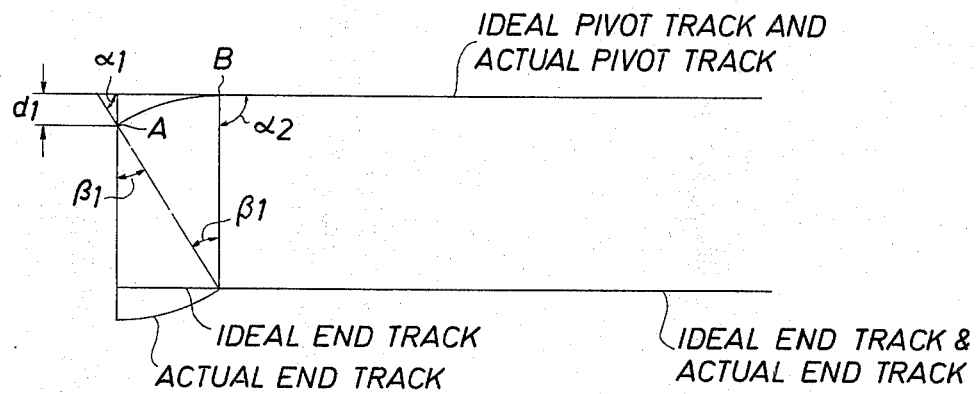
FIG. 7
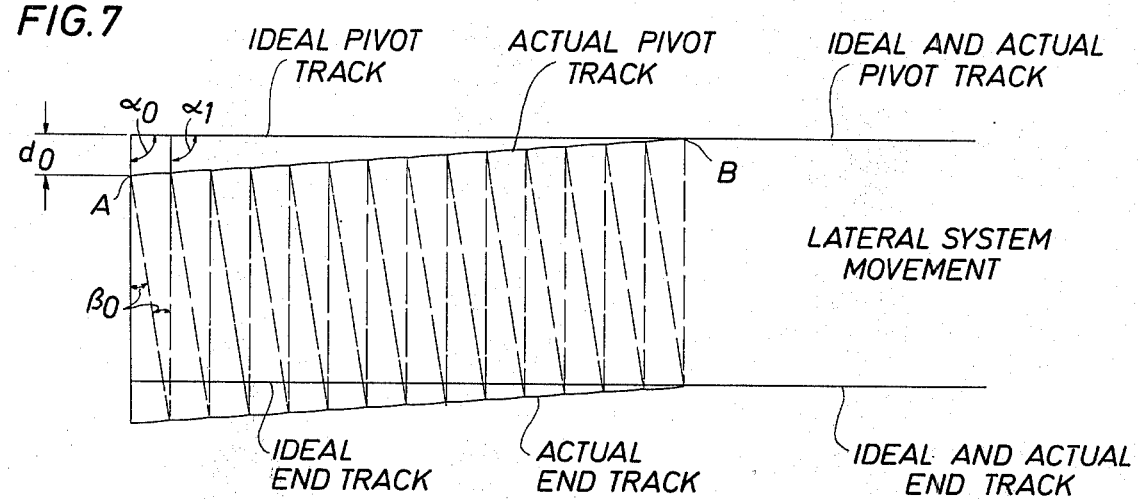
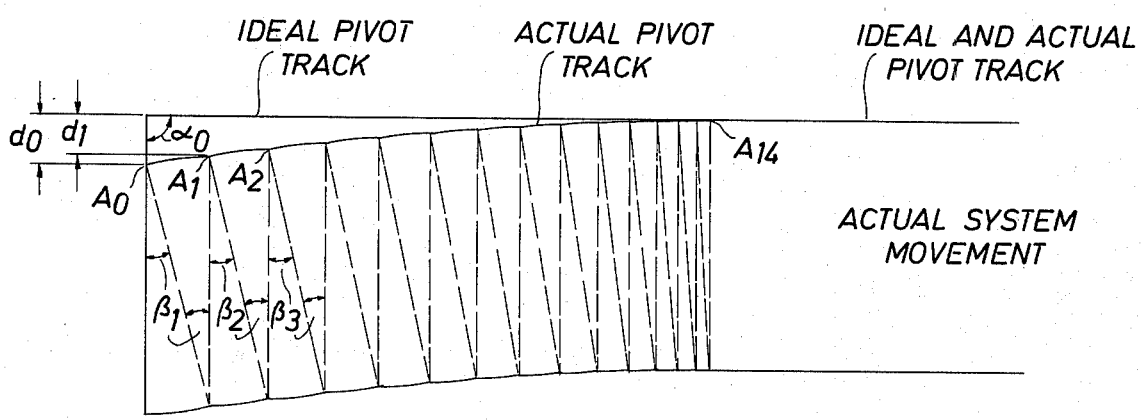
FIG. 8

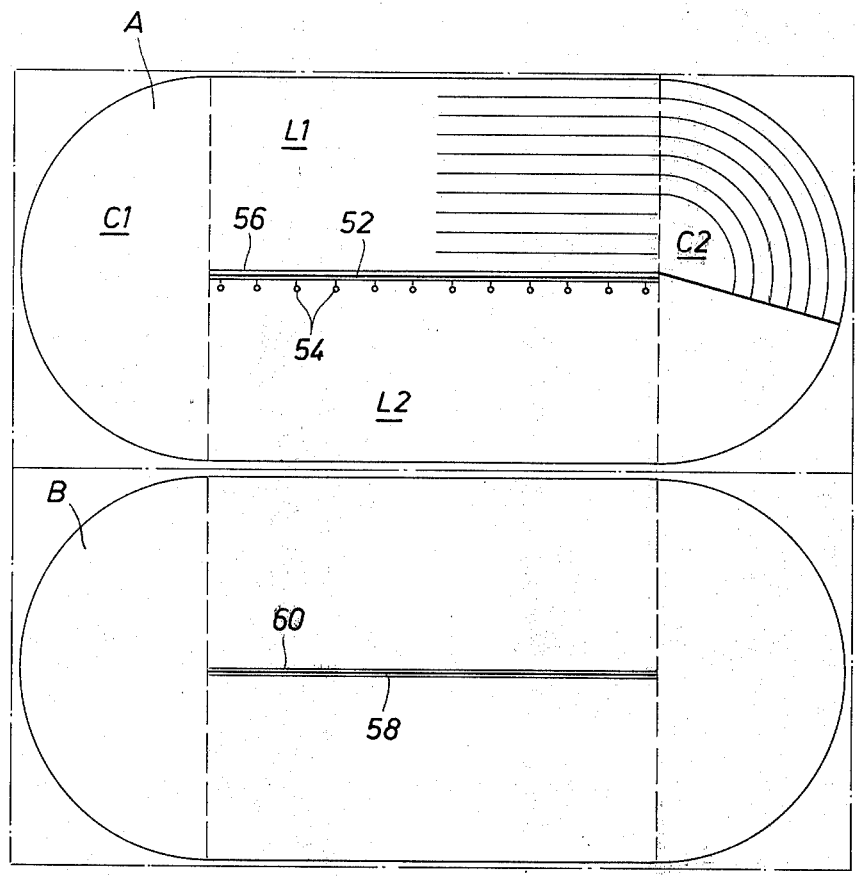
FIG. 9
FIG. 10
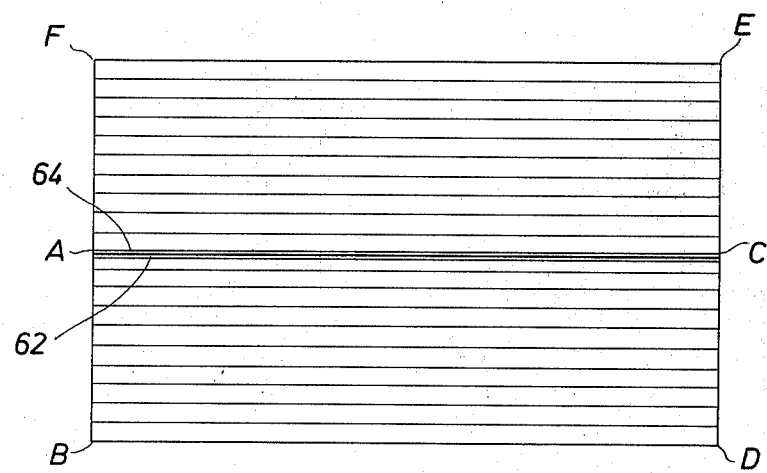

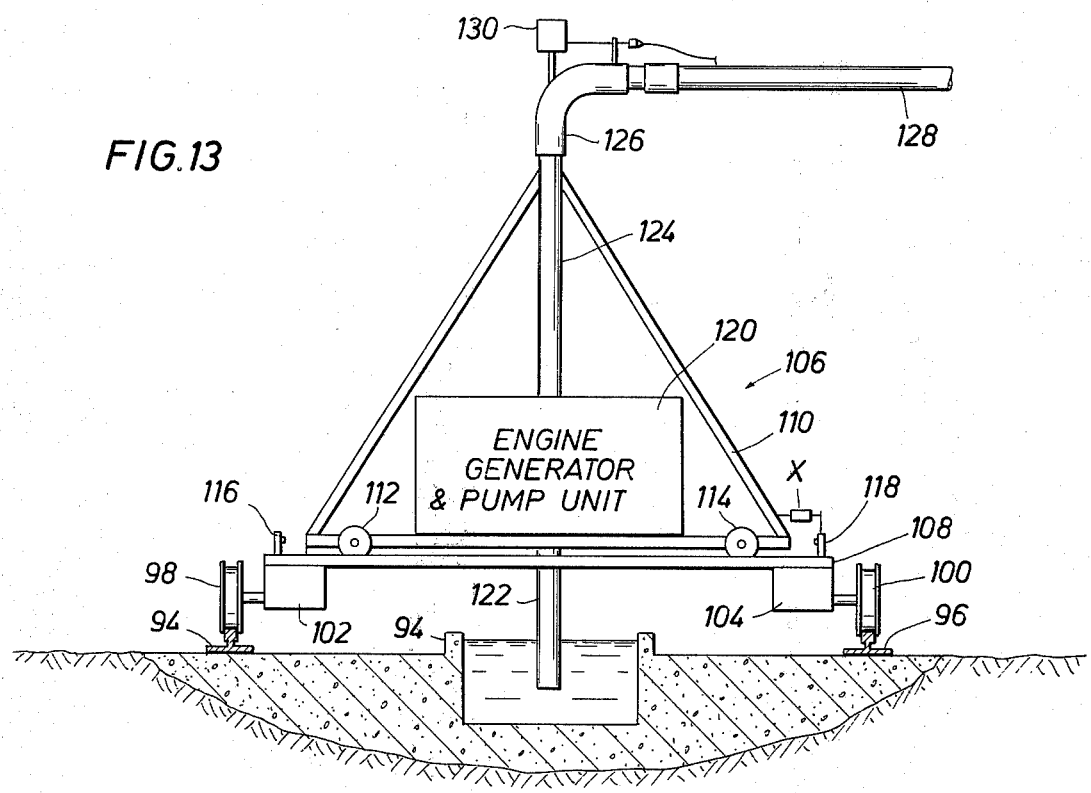
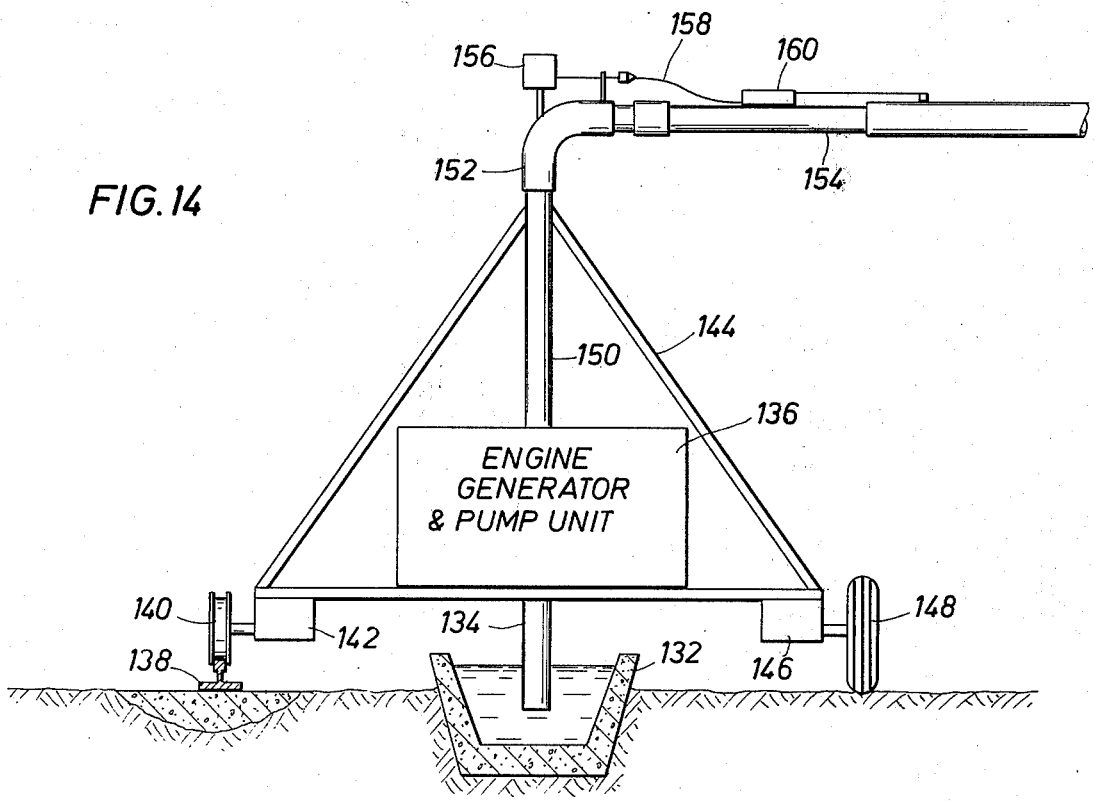

SELF-CORRECTING LINEARLY MOVABLE IRRIGATION SYSTEM

FIELD OF THE INVENTION

This invention is directed generally to irrigation systems for irrigating large land areas and more specifically is directed to elongated irrigation systems that move in substantially straight line manner over a land area to accomplish irrigation of the land area. More specifically, the present invention is directed to an irrigation system that extracts water from an elongated water supply source for the purpose of irrigation and which irrigation system is automatically movable and automatically steered over a land area for extended lengths of time without any requirement for significant attention by personnel.

BACKGROUND OF THE INVENTION

A valuable asset to the irrigation industry has been the development of irrigation systems that travel while sprinkling large land areas with water and require virtually no personnel attention during operation. Substantial elimination of the labor costs that were earlier required has greatly enhanced the commercial success of large field irrigation. Although many different types of irrigation systems have been developed over the years, the type of irrigation system that is most prevalent is the circular irrigation system which incorporates a plurality of sprinkler pipe sections that are each supported by a mechanism for inducing movement to the pipe sections. In circular irrigation systems a central pivot tower is provided that also serves as a water supply and one extremity of the irrigation system is connected thereto causing the entire irrigation system to revolve about the pivot during continuous irrigation operations. Although circular irrigation systems have been quite successful, it is clear that greater crop yields and lower cost irrigation would be achieved if the irrigation system were capable of irrigating rectangular land areas or other specifically shaped land areas as opposed to circular areas. One attempt to accomplish more rectangular irrigation through the use of circular irrigation systems is through the use of corner irrigation spray devices that are activated only during four small segments of each revolution of the irrigation system. Although the increase of land area irrigation through the use of irrigation guns is not in unsubstantial, it would nevertheless be commercially desirable to provide an irrigation system that was capable of irrigating the entirety of a large rectangular land area.

In the past, irrigation systems have been developed for irrigation of rectangular fields, but in order to provide for proper operation of the irrigation system, it is generally deemed necessary that a plurality of tracks or guideways be provided in order to physically guide the irrigation system over the land area. Of the number of patented devices that have been developed with track or guideway control in mind, U.S. Pat. No. 3,608,827 to Kinkead is typically representative. Linearly movable irrigation systems have also been developed that do not necessitate the use of tracks or guideways such as taught by U.S. Pat. No. 3,613,703 to Stout which utilizes a guide rail 52 for reference during movement over a land area and traverses by alternate movement and pivoting of each of the ends of the system. In the case of the structure identified in the patent to Stout the ambulatory irrigation system is so arranged and controlled that each end of the composite line alternately can be caused to travel a predetermined distance along an arcuate path with the opposite end of the composite line temporarily being substantially at the center of curvature of the arcuate path and with the entire line thus swinging forwardly in alternate angular direction as it moves over the land area. More simply, one extremity of the irrigation system remains static and serves as a pivot during a portion of the movement and the sequence is then reversed causing the other extremity to remain static while the first extremity is caused to move. The ends of the system are not capable of simultaneous movement.

It is considered desirable to provide a linearly movable irrigation system that does not require a track or guideway to control movement thereof such as is the case with Kinkead U.S. Pat. No. 3,608,827 and which does not cause excessive water distribution on certain of the land section such as is likely to occur when each end of the irrigation system alternately moves forward.

Accordingly, it is a primary feature of the present invention to provide a novel linearly movable irrigation system that moves in substantially linear manner over a land area and is capable of irrigating the entirety of a generally rectangular land area or irrigating a land area of an irregular shape.

It is also a feature of the present invention to provide a novel linearly movable irrigation system whereby control of the movement of the system is accomplished by sensing means that respond in regard to the position of the irrigation system rerlative to an elongated reference.

It is an even further feature of the present invention to provide a novel linearly movable irrigation system that moves in linear manner over a land area and, in the event of the occurrence of predetermined misalignment of the irrigation system relative to the reference, the irrigation system is automatically self-correcting or self-steering to maintain its travel within a defined boundary.

It is also an object of the present invention to provide a novel linearly movable irrigation system employing a reference such as an elongated guide surface which may be straight or curved as desired, wherein the irrigation system is provided with a control mechanism that senses linear displacement and angular misalignment of the irrigation system relative to the reference for controlling travel of the irrigation system relative to the elongated reference.

It is also a feature of the present invention to provide a novel linearly movable irrigation system and wherein a plurality of individually supported and driven sections are incorporated into an elongated irrigation system and wherein movement of each of the sections is controlled by its angular relationship with an adjacent irrigation section, such angular relationship control being overridden under certain circumstances by control signals received from a power and control portion of the irrigation system.

SUMMARY OF THE INVENTION

The present invention is directed to a linearly movable steerable irrigation system that is adapted to move in substantially linear manner for irrigation of a large generally rectangular land area. The irrigation system is adapted to move automatically in response to its position relative to an elongated reference such as an elongated straight or curved guide surface, guide rail, guide line or guide beam during irrigation operations. Sensing apparatus carried by a system power and control portion of the irrigation system is capable of sensing both linear displacement and angular misalignment relative to the elongated reference and automatically self-correcting the direction of movement in the event the irrigation system has moved beyond allowable limits of linear displacement or angular misalignment.

The irrigation system includes a power and control unit that is provided at one extremity thereof or intermediate the extremities of the system and which will typically be directly connected to linear displacement and angular misalignment sensors that determine relative positioning of the irrigation system relative to the reference. To the power and control unit may be connected a plurality of irrigation sections each comprising an irrigation span that is supported by any suitable mobile support such as wheels, tracks, ambulatory mechanisms, etc. that is capable of accomplishing movement of the irrigation system over the land area. An elongated irrigation conduit being a composite of a number of interconnected sections of irrigation pipe will be supported by the spans above the land area and will cause distribution of water on the land area by means of sprinkler devices carried by the various sections of water supply pipe. Each of the self-driven sections or spans of the irrigation system may be controllably activated and deactivated by the angular relationship thereof to adjacent span or section to accomplish controlled movement of each of the individual spans of the irrigation system. Conventional angular detection sensors may be employed to detect angular misalignment between the respective sections of the irrigation system. When such angular misalignment reaches a predetermined value, the drive mechanisms controlled by the angular detecting device for each section will be energized causing the drive means to impart driving movement to that particular section of the irrigation system. Such driving will continue until sufficient movement of that section has occurred to change the angular relation detection by the angular detecting device to another predetermined value, at which time the drive mechanism for that irrigation section will be de-energized.

For accomplishing steering control responsive to signals received by the power and control unit from the linear displacement and angular misalignment sensors, power drive mechanisms at each extremity of the irrigation system will be appropriately controlled to alter relative movement of the extremities of the irrigation system. For example, movement may be stopped at one extremity of the irrigation system while the other extremity of the irrigation system continues to move so as to cause a limited degree of pivotal movement of the irrigation system about the static extremity. When this pivotal movement has continued sufficiently to satisfy the requirements of the control signal, another control signal will be provided causing both extremities of the irrigation system to move at the same or different speed, causing the entire irrigation system to move in substantially linear or controllably turning manner across the land area. Upon movement of the irrigation system sufficiently to traverse opposite control boundaries defined by the linear displacement and angular misalignment sensors, another control signal will be issued, causing the opposite extremity of the irrigation system to remain static or to be controllably slowed while the other extremity of the irrigation system is allowed to continue moving. The resulting effect is a pivoting or arcuate turning of the entire irrigation system about the opposite extremity of the irrigation system whether the opposite extremity be static or moving. In other words, the irrigation system will move across the land area in substantially linear manner unless for some reason it should become linearly displaced or angularly misaligned relative to the elongated reference. This can be caused by traversing of the irrigation system over undulations in the terrain or by other than straight line positioning of the reference such as might occur if the reference is designed to cause tracking of the irrigation system to irrigate an oval land area.

The present invention is also directed to the method of accomplishing irrigation of land areas, wherein the extremities of an elongated irrigation system capable of movement across a land area in substantially linear manner is also capable of being steered automatically so as to correct any angular misalignment or lateral displacement from an elongated reference. The irrigation apparatus, under the novel method of controlling the operation thereof, is capable of irrigating generally rectangaular land areas and because of its automatic steering capability, is also capable of traversing land areas that are of irregular configuration. Each extremity of the irrigation system is capable or independent movement responsive to control signals received from a control facility and may move at different speed, stop or move at the same speed as the opposite extremity of the irrigation system. Also, the power and control facility for the irrigation apparatus may be located intermediate the extremities of the irrigation system or at either extremity thereof within the teachings of the present invention.

Water supply for the irrigation system may take the form of an elongated ditch from which water is extracted by suction or it may take the form of an elongated closed water supply system such as a pipe having a plurality of water supply connections that are automatically received and released as the irrigation system traverses its designed path of travel.

BRIEF DESCRIPTION OF THE DRAWINGS

So that the manner in which the above recited features, advantages and objects of the present invention as well as others which will become apparent, are attained and can be understood in detail, more particular description of the invention, briefly summarized above, may be had by reference to the embodiments thereof which are illustrated in the appended drawings, which drawings form a part of this specification.

In the Drawings

Figure 1:
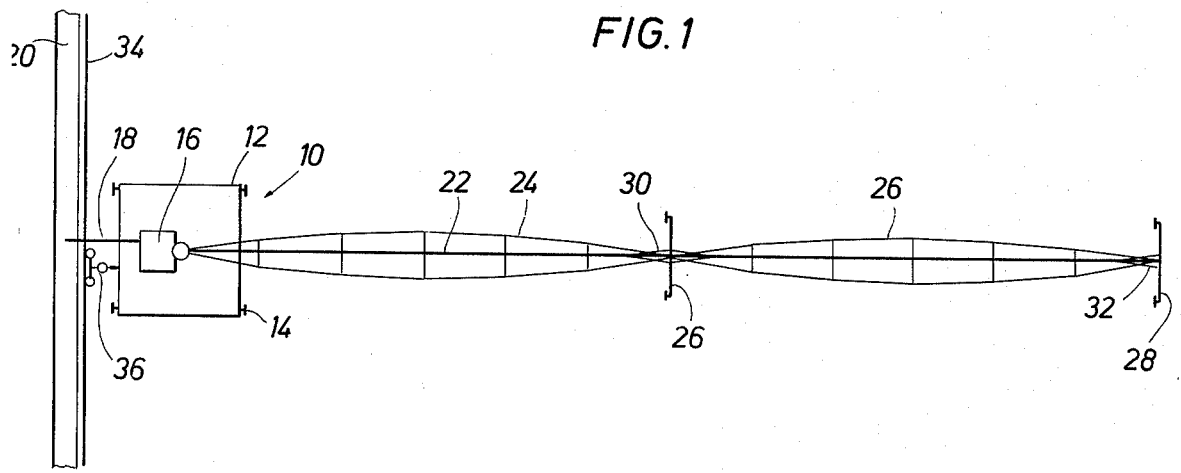

The present invention, both as to its organization and manner of operation may best be understood by way of illustration and example of certain preferred embodiments when taken in conjunction with the accompanying drawings in which:

FIG. 1 is a plan view in schematic form illustrating a portion of a linearly movable irrigation system that is constructed in accordance with the principals of the present invention.

Figure 2:
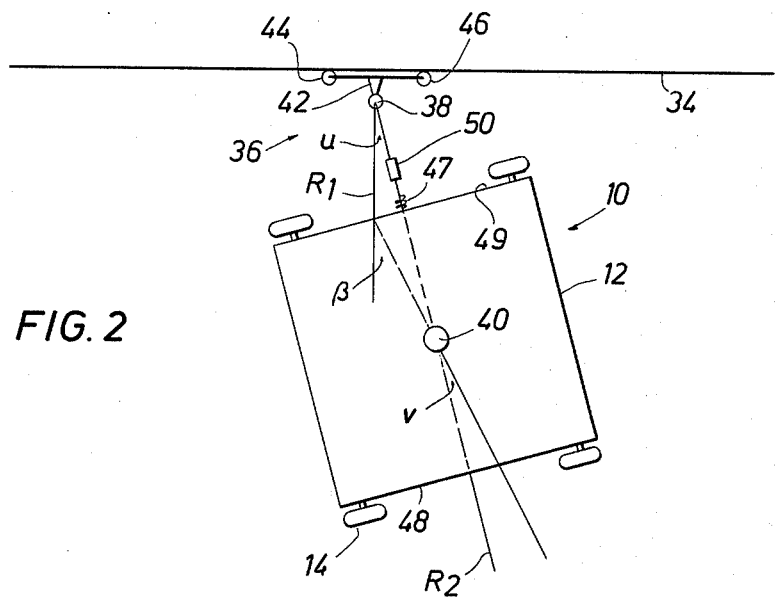

FIG. 2 is a schematic illustration of a portion of the irrigation system of FIG. 1 illustrating the position of angular misalignment and linear displacement sensors relative to a pivot frame defining one controllable extremity of the irrigation system.

Figure 3:
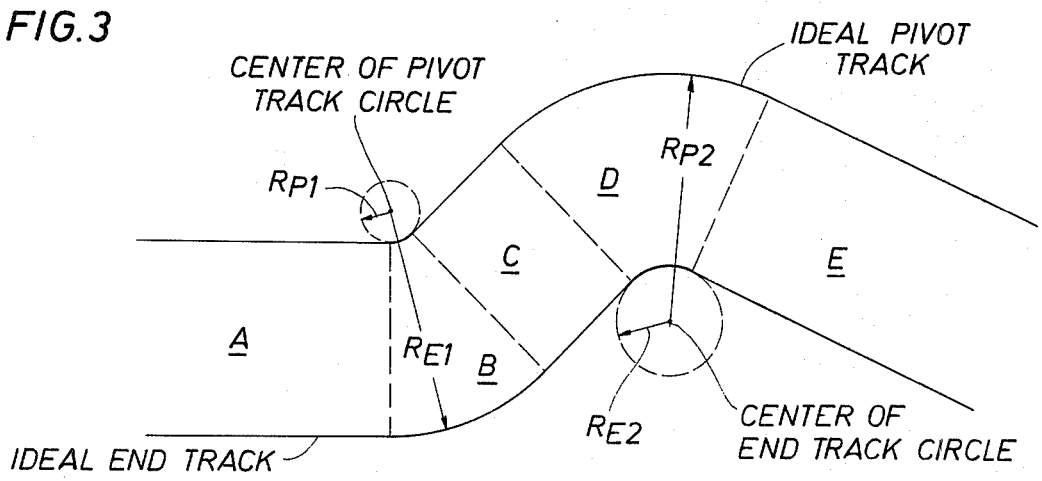

FIG. 3 is a graphical representation of the characteristics of controlled movement of the irrigation system as it moves over a land area and where the turning radius of the irrigation system may be variable.

Figure 4:
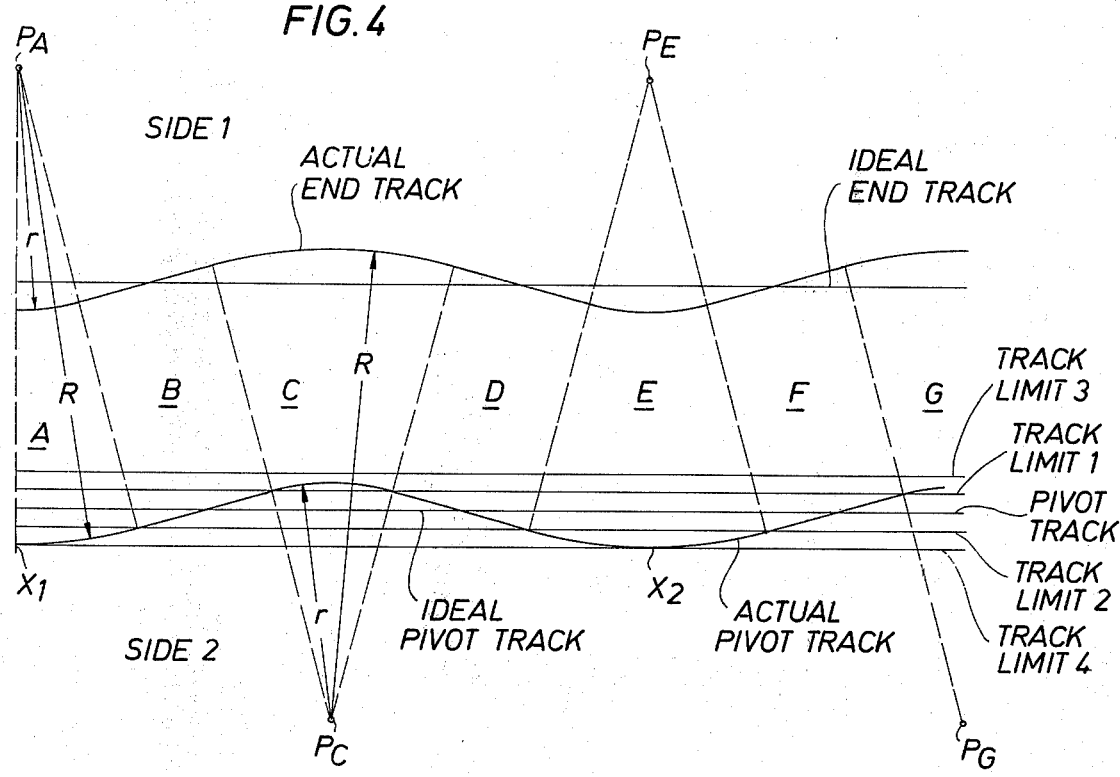

FIG. 4 is a graphical illustration representing automatic tracking control of the irrigation system under circumstances where a constant turning radius is employed to achieve self-tracking of the irrigation system.

Figure 5:
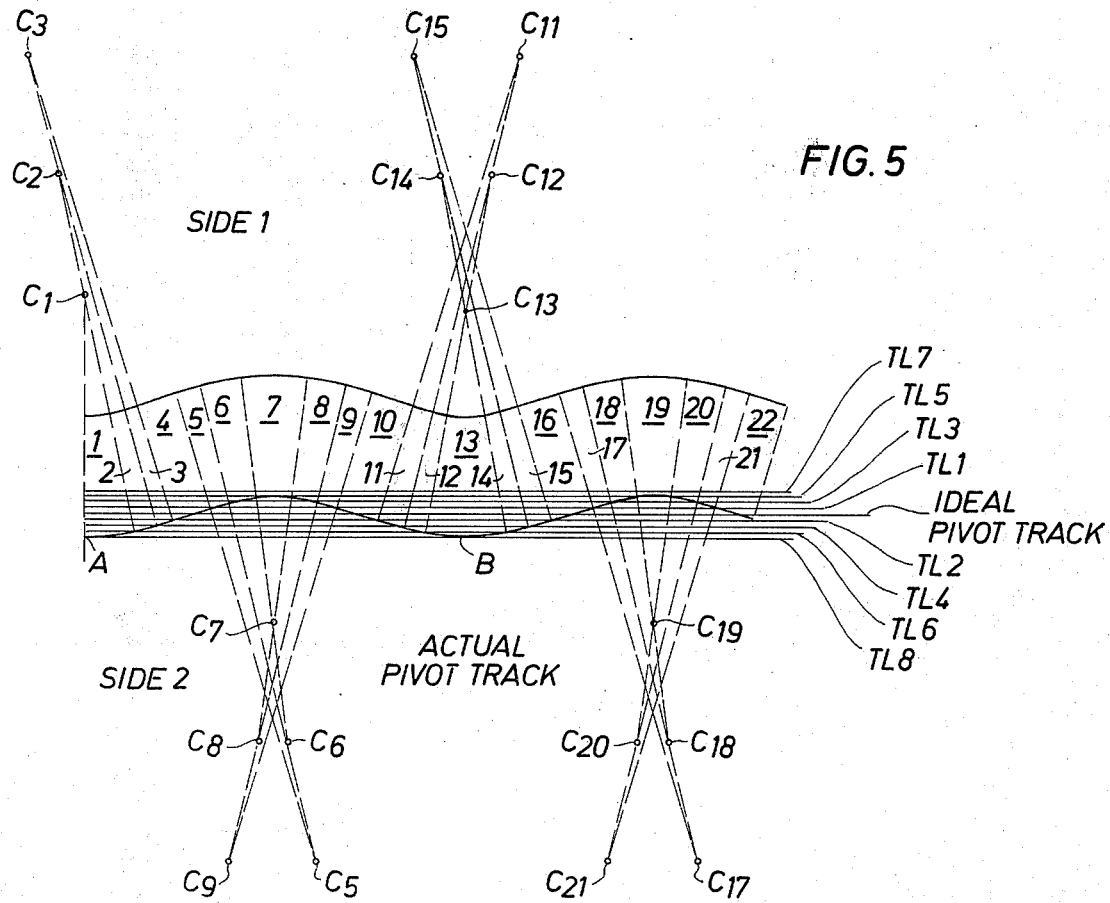

FIG. 5 is a graphical representation illustrating stepwise variations of turning radius during the correction movement as the irrigation system tracks automatically responsive to corrective signals.

FIG. 6 is a graphical representation illustrating automatic adjusting movement based on processed data from tracking sensors.

FIG. 7 is also a graphical representation illustrating sequential movement of the irrigation system relative to an ideal or designed pivot track.

FIG. 8 is another graphical representation illustrating automatic control of the irrigation system by variable sequential movement of the pivot and end portions thereof for the purpose of achieving tracking relative to an ideal pivot track.

FIG. 9 is a graphical representation in plan illustrating large land areas to be irrigated and showing automatic tracking of the irrigation system in order to accomplish sufficient irrigation of all but minor portions of that land area.

FIG. 10 is a graphical plan view of an elongated generally rectangular land area provided with an elongated water supply and illustrating self-tracking movement of the irrigation system of the present invention in order to accomplish efficient irrigation of the land area.

Figure 11:
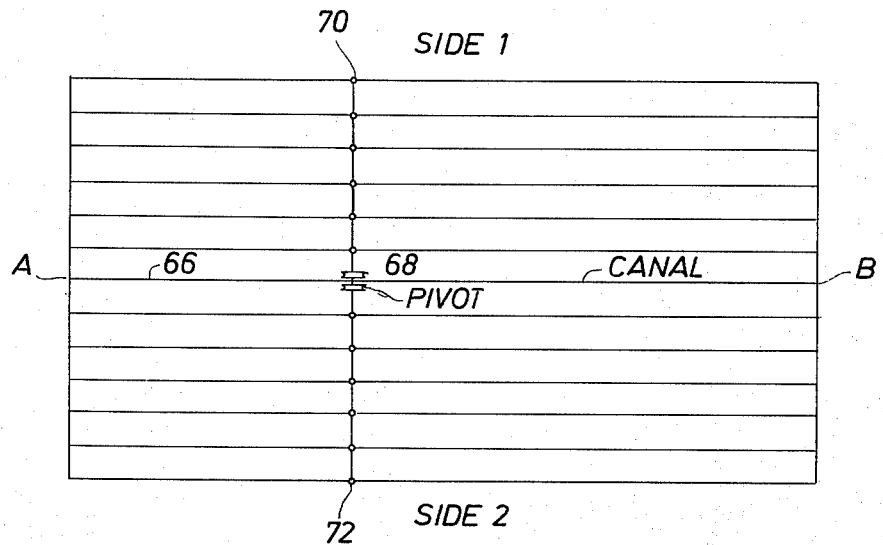

FIG. 11 is also a graphical representation in plan illustrating a generally rectangular land area provided with a water supply and illustrating positioning of individually controllable portions of the irrigation system in order to accomplish efficient irrigation of the rectangular land area.

Figure 12:
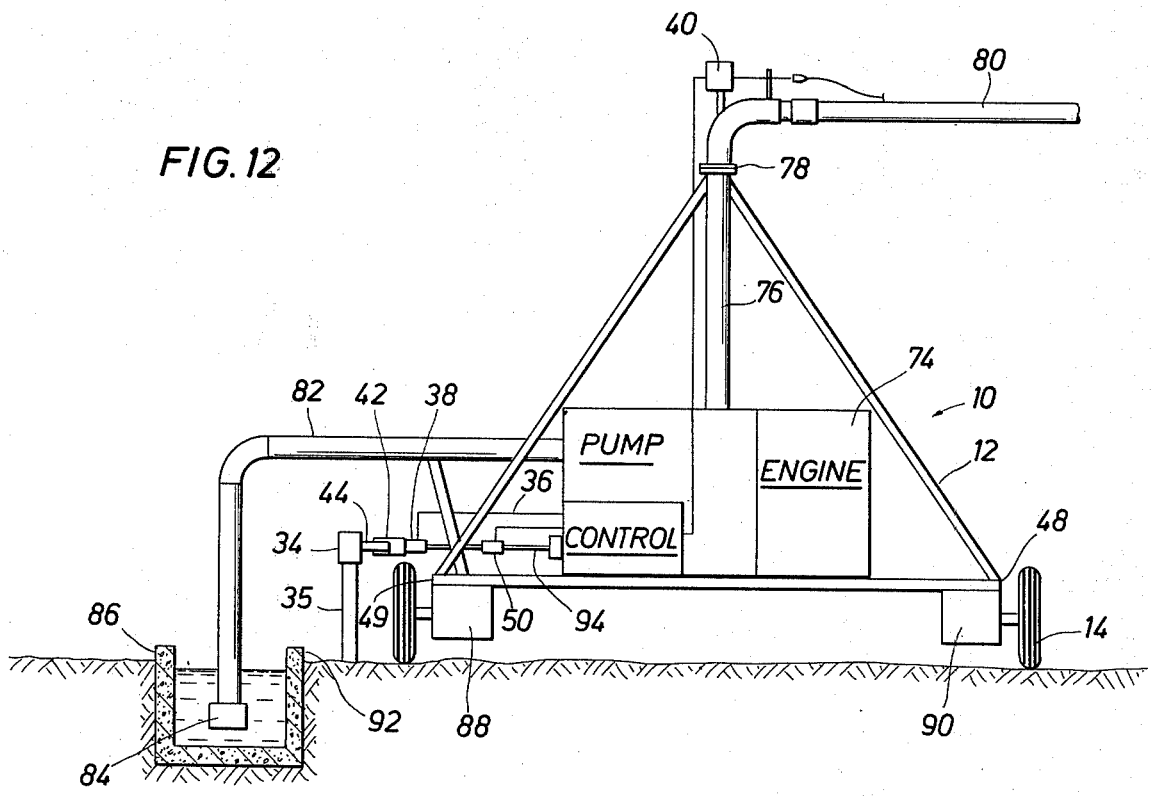

FIG. 12 is an elevational view of a power and control unit that forms a part of an irrigation system constructed in accordance with the present invention and which is provided with a water supply in ditch form with a post supported rail being provided as the reference from which the position of the power and control unit is detected.

FIG. 13 is a plan view similar to that depicted in FIG. 12, illustrating a power and control unit for an irrigation system representing a modified embodiment of the present invention.

FIG. 14 is an elevational view similar to that depicted in FIGS. 12 and 13 and representing a further modified embodiment of the present invention, wherein a single guide rail is employed to aid in the guiding funnction of the apparatus.

DESCRIPTION OF PREFERRED EMBODIMENTS

Referring now to the drawings and first to FIG. 1, there is depicted a portion of a self-driven irrigation system of the type that is adapted to move in substantially linear manner across a land area to be irrigated and to self-correct its position relative to an elongated guide or reference that may conveniently take any suitable form such as will be discussed hereinbelow. As shown in FIG. 1, the irrigation system incorporates a power and control unit illustrated generally at 10 having a structural framework 12 that may be supported by a plurality of mobile devices such as wheels 14, tracks, ambulatory mechanisms, etc. On the power and control unit 10 may be provided an engine pump and generator unit 16 providing mechanical and electrical power for operation of the irrigation system. A conduit 18, extending from the pump portion of the engine pump and generator unit 16, may communicate with a water supply source 20 and may extract water from the water supply and transmit it under pressure to a water distribution conduit 22 from which it is evenly distributed on the land surface by a plurality of conventional sprinkler devices that are carried by the water distribution conduit.

Extending from the power and control unit 10 are a plurality of irrigation sections or spans such as shown at 24 and 26 that comprise a structural framework for support of each of various sections of water supply pipe that are interconnected to form the water supply conduit 22. Each of the spans or sections may be supported by a mobile base such as shown at 26 and 28, the respective mobile bases being provided with wheels, tracks, ambulatory devices, etc. in order to provide the mobility that causes the irrigation system to traverse the land area being irrigated. Each of the mobile bases may be provided with individual power and control means allowing the drive mechanism thereof to be operated responsive to the position of a span or section of the irrigation system relative to its angular relationship with an adjacent span of the irrigation system. Each of the spans of the irrgation system will be provided with angualr detection apparatus such as illustrated at 30 and 32 that is capable of detecting the angular relationship of one of the sections of the irrigation system relative to an adjacent section and for causing generation of appropriate electrical signals to induce movement of the particular span or section of the irrigation system supported by a respective mobile base. The angular detection apparatus depicted schematically at 30 and 32 in FIG. 1 may take any suitable form within the spirit and scope of the present invention. For example angular detection apparatus such as that taught in U.S. Pat. No. 3,807,436 to Pringle may be effectively utilized for controlling movement of the various sections of the adjacent system over the land area.

For controlling the track of the irrigation system over the land area, an elongated reference 34 may be provided. The elongated reference may take many suitable forms that enable position sensing devices to react with the reference and determine the position of the irrigation system relative to the reference. For example, the reference may be a guide rail supported above the ground on posts, it may take the form of a supported guide wire and it may also take the form of a guide surface formed by the water supply, such as an external wall of a concrete lined ditch that is partially embedded in the ground or supported on the surface of the land area. The reference, where straight line reference is desired, may take the form of a laser beam or other suitable beam that may be appropriately sensed. Sensing apparatus 36 supported by the power and control unit 10 may be positioned for guiding contact with the reference 34. While the reference 34 is shown to be in the form of a straight line in FIG. 1 it is not intended to limit the present invention solely to use under conditions where the reference takes the form of a straight line. The reference 34 may be curved in any suitable form that is appropriate for guiding the track of the irrigation system about the land area to be irrigated.

For more detailed understanding of the nature of the sensing unit illustrated generally at 36, reference may be had to FIGS. 2 and 12. Although the elongated reference is shown as a separate structure, it should be borne in mind that a side surface defined by the water supply 20 may define a guide surface that serves as a reference.

Referring now to FIG. 2, the pivot framework 12 defined by the power and control unit 10 may be provided with a pair of angular sensors 38 and 40 that detect respectively the angular relationship between the elongated reference 34 and the pivot framework 12 and between the pivot framework and the first span or section of the various spans that cooperatively define the irrigation system. The angular sensor 38 is connected to a tracking structure 42 incorporating a pair of spaced guide rollers 44 and 46 that are adapted to engage the reference 34. A reference line R1 may be defined that is positioned in perpendicular relationship with a straight line extending through the center points of the guide rollers 44 and 46. A second reference line R2 may extend through the center P2 of the angular sensor 40 and may be positioned in substantially perpendicular relationship to a side surface 48 of the pivot framework 12. As shown graphically in FIG. 2 P1 is the center of rotation for the part of the guided sensor that moves along the reference that defines the ideal pivot track for the irrigation system. P1 is also the center of rotation for a linear displacement sensor 50 relative to the guided sensor mechanism $\beta$ represents the angle between the line of direction for the first span of the irrigation system and u is the angle between the actual position of the angular sensor 38 and the reference line R1 for that particular angular sensor. P2 is the center of rotation of the system relative to the pivot framework and is also the center of rotation for the angular sensor 40. $v$ represents the angle between the reference line R2 and the actual position of the first span of the irrigation system relative to reference line R2.

It will be desirable to provide the sensing head or device 42 with means for maintaining the rollers 44 and 46 in engagement with the reference surface 34. This may be accomplished by a suitable spring device contained within the linear sensor 50 or a spring device such as shown at 47 that transmits its spring action through the sensor 50. The linear displacement sensor should have no angular movement relative to the reference side 49 of the pivot framework. As it can be seen from FIG. 2, the linear displacement that will be sensed by the linear displacement sensor will not be equal to the pivot track/ideal pivot track distance, d. The sensed displacement which may be referred to as $d_n l$ is given by:

$$d_n = d_n l \cosin U_n$$

The actual values of $U_n$ will be very small (the values of $U_n$ on the figures are exaggerated for illustrative purposes only) and therefore:

$$\cosin U_n \simeq 1 \text{ and } d_n l \simeq d_n$$

Provided system span No. 1 is parallel to reference line R$_2$ we would get $$\beta_n = U_n$$

The sensed displacement $d_n l$ is now given by $$d_n = d_n l \cosin \beta_n$$

Angular displacement sensor P$_1$ will now sense the angle $\beta$ between the line of direction of the first span of the system and the reference line R1 for the first angular sensor 38. A close control of the pivot relative to the system must be made so the reference side of the pivot is always perpendicular to the line defined by the first span of the irrigation system. At times when the pivot is stationary with the rest of the system moving, like in the correction movements related in FIG. 8, for example, this problem can become exceedingly difficult to solve. The addition of an additional angular sensor positioned at the junction between the center of the pivot framework and the connected extremity of the first span of the irrigation system provides a basis for achieving a more true indication of the real value of angle $\beta$.

Although a single angular sensor may be efficient for accomplishing optimum steering control of the irrigation system, it may be found desirable to provide a pair of angular sensors as illustrated in FIG. 2. Angular sensor 40 senses the angle v between the first span of the irrigation system, herein referred to as span No. 1, and the reference line R2. The linear displacement sensor operates with a displacement movement along or parallel to the reference line R2 such as illustrated in dash lines in FIG. 2. As shown in FIG. 2 therefore both u and v are being measured and the control circuitry for the irrigation system will accomplish adding of u and v to obtain $\beta$.

$$\beta = u + v$$

This requires an adding circuit that may be obtained commercially in the form of circuitry that accomplishes transferring of the angular movements $u$ and $v$ to voltages $V_u$ and $V_v$ given by $$u = CV_u$$

$$v = CV_v$$

where $C$ is a calibration constant. The voltages $V_u$ and $V_v$ are fed into a voltage adder that achieves an output voltage $V_u + V_v$ thereby causing $\beta$ to be obtained:

$$\beta = C(Vu + Vv)$$

The particular design of the pivot framework depends upon to what extent it must be controlled to achieve any particular turning radius. If it is required that the pivot must turn within a very small turning radius, it may be necessary that the individual wheels on the pivot framework be capable of individual steering. On the other hand, if a rather large turning radius is appropriate, comparable to a distance defined by the length of the first span of the irrigation system, then the wheels of the pivotal support framework need not be designed for steerable control.

FIG. 3 is a representative of the track of an irrigation system illustrating the restrictions on curvature of the ideal track movement that may occur when one extremity of the irrigation system is capable of accomplishing a smaller radius of curvature than the opposite extremity. Areas A, C and E are areas with lateral track movement whereas areas B and D represent areas where circular track movement is involved. R$_{p1}$ is the radius of the pivot track circle and R$_{e1}$ is the radius of the end track circle when area B is being irrigated. $R_{p2}$ is the radius of the pivot track circle and $R_{e2}$ is the radius of the end track circle when area D is irrigated. It is observed that radius $R_{p1}$ is smaller than radius $R_{e2}$ and therefore tracking calculations must be achieved to accommodate the different curvature obtainable at each extremity of the irrigation system. In area A, area C and area E a completely lateral movement is required and this does not represent any significant problem from the standpoint of steering. In area B the canal water supply source or reference is curving with the center of curvature outside the pivot side of the irrigated area. $R_{p1}$ is the radius of curvature of the water supply or reference and the minimum value $R_{p1}$ is determined by the turning ability of the pivot framework. The turning radius of the pivot framework can be made very small, even turning the pivot about a center within the pivot itself is possible. However, the smaller turning radius, the higher complexity is required if automatic control is to be successful. The necessity for simplicity in the automatic control operation can under certain circumstances place a limitation on the minimum value of $R_{p1}$. If $R_{p1}$ is several times the overall length of the pivot framework, it will not be necessary to individually steer the wheels on the pivot framework structure and the end unit will of course turn in a radius equal to $R_{p1}$ plus the system length. In area D the reference or water supply canal is shown to be curving with the center of curvature outside the end of the system. $R_{P1}$ is the radius of reference curvature and $R_{E2}$ is the radius of the end track. In this situation, the limitations on $R_{P2}$ is determined by the limitation on $R_{E2}$. Unless the wheels on the end unit are automatically steered, $R_{E2}$ will have to be several times the wheel to wheel distance on the last section of the irrigation system. It is known that an $R_{E2}$ value of 124 feet (the length of an intermediate span on center pivot sprinkler apparatus) will function quite adequately since the distance of 124 feet is equivalent to the circular steering of the first mobile base structure in a center pivot sprinkler system. How much less than 124 feet of the $R_{E2}$ value can be made to successfully operate must be determined experimentally. Thus, it is known that the minimum value of $R_{P2}$ may be reflected in the equation $$R_{p2} \text{ min} \leq 124' + \text{length of system} \qquad (1)$$

Any combination of the piecewise movements A–E will be performed automatically responsive to tracking of the irrigation system relative to the reference defining the deal track for irrigation system.

When it is desired to provide automatic tracking control through the use of cost of turning radii at each extremity of the irrigation system during the correction movement, automatic tracking may be performed in the manner depicted graphically in FIG. 4. In FIG. 4 the track width is exagerated for the purpose of illustration. It should be noted that irrigation of areas A, C, E and G reflect areas that are tracked under circumstances where the irrigation system is being moved about pivot points of constant or equal radius such as depicted at $P_A$, $P_C$, $P_E$ and $P_G$. Land areas B, D and F are areas irrigated during lateral tracking movements with all of the mobile bases of the irrigation system being moved at substantially the same speed. $r$ and $R$ reflect the minimum and maximum turning radii for the pivot portion and end portion of the irrigation system, respectively.

As long as the pivot (typically defined by the power and control unit of the irrigation system) is between track limit 1 and track limit 2, referred to as TL1 and TL2, etc., both of the pivot and end extremities of the irrigation system will be moving simultaneously which will cause the irrigation system to move laterally over the land area thereby traversing areas such as B, D and F. As soon as the pivot extremity crosses to the outside of track limit 1 or track limit 2, correction control must be performed in order to cause steering of the irrigation system back toward the ideal pivot track. If irrigation operations are initiated with the irrigation system positioned as shown at $X_1$ at the left hand portion of FIG. 4 with movement to the right being provided under automatic control, it is seen that the position of the sensing portion of the irrigation system is at track limit 4 and that immediate pivotal steering of the irrigation system is necessary to approach the ideal track limit. Pivoting of the irrigation system is begun under control signals received from the power and control unit, causing the system to pivot about point $P_A$, which is the point chosen that is equal to the length of the system beyond the end portion of the irrigation system. The system is now kept moving around point $P_A$ by allowing the pivot to move at a more rapid rate as compared to the movement of the end portion of the irrigation system. After some time, the pivot will have crossed to the inside of track limit 2 and at this time control signals will be provided causing simultaneous movement of each extremity of the irrigation system. Both the pivot and the end portions will move simultaneously and at the same speed, thus performing a lateral movement of the system, but of course this lateral movement will be in angular relation to the direction of the ideal track. This lateral movement will continue until the pivot portion of the irrigation system crosses track limit 1 and at this time another control signal is issued that causes pivoting of the irrigation system about pivot point $P_C$. This pivotal movement continues until the end portion of the irrigation system has overrun the pivot portion sufficiently to cause the actual track of the pivot portion of the irrigation system to cross track limit 1. A control signal is received by the mechanism upon crossing track limit 1 which again causes simultaneous operation of each extremity of the irrigation system, causing it to traverse laterally defining irrigated area D. The irrigation system at this time will be moving back toward track limit 2 where, upon crossing track limit 2 appropriate signals will be provided to cause pivoting of the system about point $P_E$. The tracking control is thus continued, resulting in hunting movement of the sensing portion of the irrigation system as the system moves across the field being irrigated. The hunting movement is not necessarily sinusoid as shown in FIG. 4 because factors such as unevenness of the area being irrigated, for example, may cause the irrigation system to be moved one way or the other irrespective of the relationship of the sensing unit to the ideal track. Moreover, if the irrigation system is properly aligned when operations are initiated and the area being irrigated is virtually flat, it is probable that the irrigation system will run the entire length of the field with the sensing unit between track limits 1 and 2 and, therefore, no steering of the system will be necessary.

Even though automatic tracking control may be achieved by providing means for achieving turning of the system about a constant turning radius, as is evident from FIG. 4, it is possible under the present invention to provide automatic tracking control through utilization of variable turning radii during correction movements. In FIG. 5, there is provided a graphic illustration of stepwise variation of turning radius during correction movement. In the graphical illustration set forth in FIG. 5, reference characters such as TL7, for example, concern the various track limits that are on either side of the ideal pivot track and the various turning movements that are accomplished by rotation of the system about different turning radii are depicted by numbers 1–22, which depict land areas that are traversed during different control performance. For purposes of operational equations, $C_r$ is the center of rotation for the system when area X is being irrigated and A and B represent two points that are located one cyclical period apart on the oscillating pivot track. TLX relates to track limit X for the purpose of the operational equation that is necessary to provide the various control functions desired.

In FIG. 5 the location of the center of rotation of the irrigation system is a function of the distance between the actual pivot track and the ideal pivot track. It is possible according to FIG. 5 to provide as many as thirteen control functions for achieving stepwise variation of the turning radius of the irrigation apparatus during corrective movement on one side of the ideal pivot track. Likewise, 13 different control actions are necessary for achieving movement of the irrigation system in the opposite direction with respect to the ideal pivot track. This particular number of control functions, however, is not to be considered as limiting the scope of the present invention since the design of the control facility will result largely from the complexity of movements that are required for achieving optimum steering of the irrigation system as it traverses a land area. If the land area is substantially flat, it is likely that the number of control functions will be held to a minimum and therefore the circuitry that is required for achieving the control functions will be of relatively simple nature. The position of the pivot tracking sensor determines which one of the thirteen control actions should be applied. For example, if an initial condition with the pivot at point A on FIG. 5 is assumed, with the angle between the system and the ideal pivot track being 90°, the following sequence of control actions will take place:

Control Action No. 1

For purposes of the description of the control actions, the sensing extremity of the irrigation system will be referred to as the "pivot" and the opposite extremity will be referred to as the "end". The control facility, responsive to the sensors, provide the pivot and the end with individual run signals at point A, with the run signal to the pivot being arbitrarily twice the length of the run signal to the end. Relationships other than even multiples of the length of the irrigation system may also be employed successfully, but for purposes of simplicity operation will be depicted as follows in terms of even multiples of the length of the irrigation system. The system will now make a circular movement with $C_1$ as the center of rotation with $C_1$ being positioned one system length beyond the end of the irrigation system. This will eventually cause the pivot of the system to cross TL6 and when this occurs the sensors will provide a second control signal initiating a second control action.

Control Action No. 2

Responsive to the signal received from the sensors as the pivot crosses TL6 while approaching the ideal pivot track individual run signals will then be transmitted to the pivot and end portions of the irrigation system. This run signal will cause the pivot to move 1.5 times the length of the run signal to the end thereby causing the system to turn with $C_2$ as its center of rotation. Point $C_2$ will be arbitrarily placed two system lengths beyond the end portion of the irrigation system and therefore pivotal movement of the irrigation system in area 2 will be at a lesser rate as compared to area 1. When this particular pivotal movement has continued sufficiently to cause the pivot portion of the system to cross TL4, control action 2 will be terminated and an appropriate signal will be transmitted from the sensors initiating control action 3.

Control Action No. 3

After the pivot has moved across TL4 while approaching the ideal pivot track the run signal to the pivot will be modified by appropriate control signals, causing pivot to move four thirds of the length of movement of the end portion of the system during the control period. The system will therefore turn with $C_3$ as the center of rotation, point $C_3$ being three system lengths beyond the end portion of the irrigation system. This movement will cause the pivot of the irrigation system to cross TL2 after running a sufficient distance to traverse area 3, at which time the pivot will cross TL2 causing the sensing system to provide signals that initiate control action 4.

Control Action No. 4

After the pivot portion of the irrigation system has crossed TL2 while approaching the ideal pivot track movement of the system will be of lateral nature. Between track limits TL2 and TL1 the control signal that is issued by the control circuitry responsive to the position of the sensors will cause both the pivot and end portions of the irrigation system to operate at the same speed, thereby providing a lateral traverse, irrigating rectangular area 4. This will continue until such time as the pivot has crossed the ideal pivot track and TL1, at which time another control signal will be received from the sensors indicating that a turning movement is necessary to bring the system back toward the ideal pivot track.

Control Action No. 5

After the pivot portion of the irrigation system has crossed TL1 after having moved from TL2 across the ideal pivot track, a signal will be transmitted from the sensors causing the run signal to the pivot to be three-fourths of the length of the run signal to the end portion of the system. The system will now turn with $C_5$ as the center of rotation, point $C_5$ being three system lengths beyond the pivot portion of the system. During this period of time the system will begin its turning operation and will irrigate area 5 of its traverse. Since movement of the irrigation system will continue to be in a direction away from the ideal pivot track by virtue of the large turning radius about point $C_5$, it will cross track limit TL3, causing the sensors to provide another control signal that increases the pivotal relationship of the system.

Control Action No. 6

After TL3 has been crossed by the pivot the control signal will cause additional pivoting to occur about point $C_6$ which is located two system lengths beyond the pivot portion of the system as shown in FIG. 5. However, turning movement will still be in a direction away from the ideal pivot track, causing the pivot to move toward TL5 and causing the irrigation system to irrigate area 6.

Control Action No. 7

As the pivot crosses TL5 an additional control signal will be provided causing further pivotal movement to occur about pivot point $C_7$ which is located one system length beyond the extremity defined by the pivot and the speed of the pivot will be one-half the speed of the end portion of the system. Under this condition the system will be caused to pivot through land area 7 until such time as the actual track of the pivot again crosses TL5 with the direction of movement of the pivot being back toward the ideal pivot track. After the pivot has reached pivot track TL5 an additional control signal will be transmitted from the sensors that ceases irrigation in area 7 and begins irrigation in area 8.

Control Action No. 8

The control signal that is received upon crossing of TL5 will cause further pivotal movement to occur about point $C_8$ which is located two system lengths from the position of the pivot as shown in FIG. 5 and causing pivotal movement of the system through area 8 to be at a slightly greater radius of curvature as compared with area 7. Pivotal movement of the system will continue about point $C_8$ until the point crosses TL3 at which time another control signal is received that effects transfer of the pivotal relationship from point $C_8$ to point $C_9$.

Control Action No. 9

After the pivot has crossed TL3 further pivoting will occur about point $C_9$ which is located three system lengths from the pivot point of the irrigation system. Pivoting will be at its greatest radius of curvature and irrigation area 9 will be of less curvature than areas 7 and 8. The run signal to the pivot will be three-quarters of the length of the run signal to the end portion of the system and the system will therefore turn with point $C_9$ as the center of rotation. Movement of the irrigation system will continue with the pivot moving toward the ideal pivot track until such time as the pivot crosses TL1 where appropriate signals will be received from the sensors causing control action 10 to begin.

Control Action No. 10

After TL1 has been crossed by the pivot, signals received from the sensors will cause both extremities of the irrigation system to move at the same speed and therefore area 10 being irrigated is a generally rectangular area caused by lateral traversing of the system. This will continue until the pivot has crossed the ideal pivot track and has reached track limit TL2.

Control Action No. 11

After the pivot has crossed track limit TL2 a control signal will be received indicating that movement has occurred outside of the boundary of optimum movement and indicating that steering of the system is necessary to bring its direction of movement back toward the ideal pivot track. When this occurs, the initial signal will cause the system to pivot about point $C_{11}$ which is located three-system lengths from the end portion of the irrigation system. Pivoting of the system about point $C_{11}$ during irrigation of area 11 will in essence slow the rate of movement of the irrigation system away from the ideal pivot track.

Control Action No. 12

After movement of the pivot has continued sufficiently to cross TL4 an additional signal will be received from the sensor mechanism, causing further pivotal movement to be continued about point $C_{12}$, which is located two system lengths beyond the end portion of the irrigation system. This radius of curvature is of course less than the radius of curvature about point $C_{11}$ and therefore effective movement of the pivot away from the ideal pivot track will be effectively slowed by an additional amount. Irrigation of surface area 12 will continue until the pivot has reached track limit TL6 whereupon an additional signal is received from the sensors causing further pivotal movement to occur about point $C_{13}$, which point is located one system length beyond the end portion of the system.

Control Action No. 13

The shortest radius of curvature depicted in FIG. 5 is one system length from the end portion of the system as shown in FIG. 5 and pivoting of the system about point $C_{13}$ accomplishes a greater degree of turning as compared to surface area 11 and 12. Pivot movement during irrigation of area 13 will cause the pivot to move toward track limit TL8 until point B is reached, at which time the pivot will be at its greatest distance from the ideal pivot track. Pivotal movement about point $C_{13}$ will continue, causing the pivot to move away from track limit TL8 and back toward the ideal pivot track. At point B the condition of the irrigation system will be substantially the same as is the case with point A and further tracking movement from point B through areas 14–22 will continue in the same manner as discussed above in connection with movements through areas 1–13.

It will be observed from FIG. 5 and the descriptive matter related thereto that the irrigation system of the present invention is capable of sensing its position relative to an ideal pivot track and providing specific characteristics of correction that are designed to cause the irrigation system to move within particular limits of error. Obviously the track shown in FIG. 5 is greatly exaggerated for purposes of illustration. In actual use, track limits TL1–TL8 will establish error boundaries that may be only a few feet in width. The irrigation system will readily track an ideal pivot track with sufficient closeness that contact may be easily maintained between the irrigation system and a water supply system to which it may be connected. Points A and B depicted graphically in FIG. 5 are equivalent points, being one cyclical period apart on the oscillating pivot track. Point A and point B are the same distance from the ideal pivot track thus making the amplitudes of the tracking oscillations constant. Many factors, including errors in tracking sensor and alignment control, errors caused by undulation of the terrain being irrigated could cause the amplitudes of cyclical movement to increase or decrease as irrigation operations are continued. This could create a highly unstable situation that after long operating time could eventually bring the system so far out of ideal tracking that an automatic shut down is required. Thus, tracking limits TL7 and TL8 may define boundaries beyond which operation of the system will no longer continue. The control system for the irrigation apparatus may be provided with a shut down circuit that is activated at any time the pivot crosses a predetermined boundary on each side of the ideal pivot track and this boundary may be track limits TL7 and TL8. When shut down occurs, manual realignment of the irrigation system relative to the ideal pivot track will be required. In the event cyclical errors that occur each time the irrigation system oscillates relative to the ideal pivot track should be continuously increasing, it is possible that the irrigation system may operate for extended period of time for example days or even weeks before an automatic shut down occurs which must be followed by manual adjustment.

In addition to the distance sensor, an angular sensor may be required to determine whether the pivot is approaching or moving away from the ideal pivot track. To improve the tracking performance illustrated in FIG. 5, it may be appropriate to decide the control action based both on pivot track position and the angle between the system and the ideal pivot track. By examining control action No. 4 in area 4 on FIG. 3 it is readily observed that an "overswing" takes place. In the area 4 a change from lateral movement to circular movement with the center of rotation on side 2 should be initiated before the pivot crosses to side 1 of the ideal pivot track. A similar modified control action should be made in areas 10, 16 and 22 which would cause a gradual reduction in the amplitudes of oscillations for the ideal pivot track. However, the total number of different control actions built into the automatic control system could be greater than the thirteen control actions that are chosen for the control facility illustrated in FIG. 5.

An alternative embodiment of the present invention may employ automatic control by calculation of the adjusting tracking movement based on sensing of the difference from the ideal pivot track and the angle between the system and the ideal pivot track. With reference now to FIG. 6, two measurements are performed for achieving the correction that is required to bring the actual track of the system back toward the ideal pivot track. The first measurement is that of deviation from the ideal pivot track $d$ and the second measurement is sensing of the angle between the system and the ideal track line $\alpha$. Sequence of operations required by this control is as follows:

1. Sense distance $d_1$.
2. Compute $\beta_1$ necessary to make $d_1$ equal ($1-\cosin \beta_1$) × length of irrigation system.
3. The pivot is kept stationary and the end is kept moving until $\alpha$ equals 90° minus $\beta_1$ equals $\alpha_1$.
4. The end is kept stationary and the pivot is kept moving until $\alpha$ equals 90° equals $\alpha_2$. The pivot will now be back on the ideal pivot track and with $\alpha$ equal to 90° a lateral movement can be performed until a new correction movement is required.

With regard to FIG. 6, A is the initial starting point for the pivot and $\beta$ is the adjusting angle necessary to bring the pivot back to the ideal pivot track after two sequential movements of the system have occurred. B is the point on the ideal pivot track where the pivot will be located after the sequential correction movement has been carried out. $d$ is the distance from the ideal pivot track to the initial starting point of the pivot while $\alpha$ is the angle between the system and the ideal pivot track. Once the necessary steering correction has been made, however, further movement of the system may be of lateral nature.

Referring now to FIG. 7 it may be desirable to achieve automatic control by accomplishing sequential movement of both the pivot and end portions of the irrigation system as FIG. 7 depicts in graphical form. A chosen initial condition may be established with the pivot at point A as shown in FIG. 7 and with the angle between the system and the ideal pivot track equal to 90°. The system movement is from left to right with the sequence of correction movements being as follows:

1. While the pivot is caused to remain stationary the end portion of the irrigation system is kept moving until $\beta$ equals $\beta_0$ where $\beta_0$ is a predetermined value of $\beta$.
2. The pivot is then started and kept moving, with the end being stationary until $\alpha$ equals 90°.
3. The tracking sensor measures the new value of $d$ and if $d$ is greater than zero and the pivot is on side 2 of the desired pivot track a new correction movement of step 1 and step 2 will be automatically performed. If $d$ equals zero, the end and the pivot of the irrigation system keep moving simultaneously thereby causing a lateral movement of the irrigation system to be performed.

Steps 1–3 will then be repeated until a value of $d$ close to zero is obtained. In FIG. 7 $d$ is approximately zero after 14 sequences of the correction adjustments involving steps 1–3. After that time, the system is kept moving laterally until the pivot begins to leave the ideal pivot track. A new tracking adjustment will then be started at that piont causing steps 1–3 to be repeated until the system is again moved back to the ideal pivot track. The value of $d$ at point A on FIG. 7 is of course exagerated for purposes of illustration. A scale drawing with the real value of a tolerable $d$ would not illustrate the actual movements. As it is seen from FIG. 7, every sequence of two step movements will move the whole system closer to the ideal pivot track, small oscillations around the ideal pivot track will develop as the ideal track line is being crossed.

Corrective tracking may also be obtained by making $\beta$ a function of the distance between the pivot and the ideal pivot track as illustrated graphically in FIG. 8. In FIG. 8, $d_n$ is the distance from point $A_n$ on the actual pivot track to the ideal pivot track. $\beta_n$ is the control angle for control sequence $n$ while $\alpha$ is the angle between the system and the ideal pivot track $\alpha_n$ is the value of $\alpha$ when the pivot is at point $A_n$ and the circular movement of the stationary pivot is initiated which may be referred to as:

$$\alpha_n = 90°$$

$A_{14}$ is the point where the actual and the ideal pivot track coincide.

FIG. 8 illustrates an automatic tracking control that in principle is very similar to that illustrated in FIG. 7. But the correction angle $\beta$ will be made a function of the sensed value of $d$ as shown in FIG. 8.

A relationship between $\beta_n$ and $d_{n-1}$ may be given by equation $$d_n = C_1 d_{n-1}, C_1 < 1 \qquad (2)$$

With S being the length of the system from the pivot to the end tower of the irrigation system the correction angle $\beta$ is determined by:

$$d_{n-1} - d_n = S(1 - \cos\beta_n) \quad (3)$$

The Taylor series for $f(x)$ may be given by:

$$f(x) = f(Xo) + f'(Xo)\Delta X + \tfrac{1}{2}f^2(Xo)(\Delta X)^2 + \tfrac{1}{6}f^3(Xo)(\Delta X)^3 + \cdots \quad (4)$$

Applied to Cosin X, the Taylor series gives by including terms of up to the second order.

$$\cos X = \cos Xo - \sin(Xo)\Delta X - \tfrac{1}{2}\cos Xo (\Delta X)^2 + \cdots \quad (5)$$

Applying Equation 5 to FIG. 8 gives:

$$Xo = 0$$
$$\Delta X = \beta_n, \text{ and thus} \quad (6)$$
$$X = Xo + \Delta X = \beta n \quad (7)$$

From Equation (5) and Equation (7) we get $$\cos\beta_n = \cos(0) - \tfrac{1}{2}\cos(0)(\beta_n)^2 = 1 - \tfrac{1}{2}(\beta_n)^2 \quad (8)$$

Equation (3) and Equation (8) give $$d_{n-1} - d_n = S(1 - (1 - \tfrac{1}{2}(\beta_n)^2)) = \frac{S(\beta_n)^2}{2} \quad (9)$$

Equation (2) and equation (9) gives $$(1 - C_1)d_n = \frac{S(\beta_n)^2}{2} \quad (10)$$

or solved with respect on $\beta_n$ $$\beta_n = \sqrt{\frac{2(1-C_1)}{S}} \sqrt{d_{n-1}} = C_2\sqrt{d_{n-1}} \quad (11)$$

where $$C_2 = \sqrt{\frac{2(1-C_1)}{S}} \quad (12)$$

As $C_1$ is a chosen constant we can just as well choose the value of $C_2$. $C_2$ will thus be an adjustable parameter in the control circuit.

With $\beta_n$ now given by:

$$\beta_n = C_2\sqrt{d_{n-1}} \quad (13)$$

Equation (13) can be built into the control circuit and the control action can be made as follows.

1. A linear sensor at the pivot will determine the actual value of $d_n$ and on which side of the ideal pivot track the acutal pivot track is located. If the actual pivot track is on side 1 control sequence No. 1 is started and if the actual pivot track is on side 2 control sequence No. 2 is started. Control Sequence No. 2 (The acutal pivot track is on side 2 of the ideal pivot track)

Assume initial condition with pivot at $A_o$ and $\alpha = \alpha_o = 90°$ The control circuit will now compute $\beta_1$ given by Equation (13), with $n = 1$ $$\beta_1 = C_2\sqrt{d_o} \quad (14)$$

$C_2$ is an adjustable parameter in the control circuit. The problem is in performing the square root operation on $d_o$. This problem can be solved as follows: The linear displacement $d$ is transferred to a potentiometer which will give a voltage output, $v$, as a linear function of $d$ given by:

$$d = C_3 v, \text{ where } C_3 \text{ is calibration constant} \quad (15)$$

At point A on FIG. 8, equation (15) becomes $$d_o = C_3 v_o \quad (16)$$

Equation (14) and equation (16) give $$\beta_1 = C_2\sqrt{C_3 v_o} = C_4\sqrt{v_o}, \text{ where} \quad (17)$$

$$C_4 = C_2\sqrt{C_3} \quad (18)$$

It will be desirable to compute the square root of $v_o$ and this can be done by utilizing a commercially available square rooter (device that has an output voltage equal to the square root of the input voltage). An example of a commercially available square rooter device may be the Burr Brown square rooter No. 4126 that will function effectively for computation of the square root of $v_o$. The adjustable circuit parameter then will be $C_4$. Once $\beta_1$ has been computed, the following sequence of track adjustment is initiated and will take the following form:

a. The pivot will be kept stationary while the end keeps moving until a sector with angle $\beta_1$ equals $C_4\sqrt{v_o}$ is obtained. At this point the end stops.

b. The end is kept stationary and the pivot is kept moving until it reaches point $A_1$ where it stops. At point $A_1$, a new sensing of the tract displacement $d$ is performed and either control sequence No. 1 or control sequence No. 2 is initiated depending upon which side of the ideal pivot track (side 1 or side 2) the displacement $d$ occurs.

FIG. 8 is representative of control sequence No. 2 where the actual pivot track is on side 2 of the ideal pivot track. If it is assumed that an initial condition is established with the pivot on side 1 instead of side 2 as shown in FIG. 8 and that the angle between the system and the ideal pivot track is 90°, the computation of the required correction angle will be performed in the same way as in control sequence No. 2, the only difference being the sequence of pivot or end movement necessary to bring the irrigation system back into line with ideal pivot track. To make the pivot approach the ideal pivot track from side 1, the end must first be kept stationary with the pivot moving until the calculated angular movement is obtained. The pivot is then kept stationary with the end moving until the system is again disposed in a 90° relationship with the ideal pivot track. At this time the pivot will be closer to the ideal pivot track than it was at the start of control sequence 1 and the alternate sequencing of the pivot and end portions of the system will continue until the pivot has aligned itself with ideal pivot track. As the pivot gets closer and closer to the ideal pivot track the oscillations or stepwise movement will become very small as shown in FIG. 8 until such time as the system is disposed in 90° relationship with the ideal pivot track and the pivot is on the ideal pivot track. Under this condition, the irrigation system will be induced to move laterally until the happening of an occurrence that causes the pivot to move away from the ideal pivot track, where the tracking sequence will again begin.

It is intended to be within the spirit and scope of the present invention to modify corrective tracking of an irrigation system responsive to the characteristics of correction that are required for keeping the system on or close to an ideal track, thereby insuring unattended operation for long periods of time without automatic shut down. Other choices of control equations may be effectively utilized depending upon the particular characteristics of control that may be required. One such example may take the following form:

$$\beta_n = C_5 d_{n-1} \tag{19}$$

In this particular equation $C_6$ is a constant and the control equation will function effectively through utilization of a linear potentiometer, an angular sensor, and a sequencing control circuit. No square rooter is necessary and therefore much of the complexity of the circuitry that might otherwise be required is effectively reduced.

Another control equation may take the form:

$$\beta_n = (C_6 d_{n-1})^r = C_6{}^r (d_{n-1})^r = C_7 (d_{n-1})^r \tag{20}$$

This control equation will function efficiently through utilization of an exponential potentiometer, an angular sensor and a sequencing control circuit. The circuitry for accomplishing steering control of an irrigation system in accordance with this particular equation will be of minimal complexity.

For the particular control scheme illustrated in FIG. 8, there may be a requirement that the linear and angular sensors have perfect operation in order to perform the intended control action. If it is assumed that the system is straight and that the reference side of the pivot makes a 90° angle with the system line, the reference side of the pivot, illustrated at 49 in FIG. 2, may be effectively utilized for determining the actual position of the system. In other words, the pivot portion of the irrigation system will be proper if the linear displacement sensor indicates it to be on the ideal pivot track and the angular sensor indicates the angle between the ideal pivot track and the reference side of the pivot to be 0°. Obviously, with each section of the irrigation system being individually controlled and being perhaps angular disposed relative to an adjacent span or section, a straight line will not be defined at all times by the irrigation system. There must therefore be provided sufficient allowance in the control circuitry to account for either leading or lagging of the various spans of the system relative to the pivot and end portions.

Referring now to FIG. 9, in broken lines there is illustrated a large rectangular land area for which irrigation is desired. Superimposed on the land area are areas A and B that define area that may be tracked by an irrigation system operating in accordance with the present invention. In area A there may be provided an elongated water supply system having an elongated water supply conduit 52 that may either be surface mounted or installed below the surface of the land area and a plurality of water supply connectors 54 may extend from the water supply conduit. Connecting apparatus carried by the power and control unit, and which may take any suitable conventional form, may be received by the connectors 54 in sequential manner to provide the power and control unit with a supply of water as it moves in relation to the pivot track 56.

In the case of irrigated area B, the water supply may conveniently take the form of an elongated canal 58 that may be defined by a concrete trough or the like that may be supported on the surface of the land area or may be embedded in the land area to any desired extent. A pivot track 60 is illustrated to be disposed in parallel relation with the canal 58, but it should be borne in mind that the pivot track 60 may take the form of a side surface of the structure defining the canal 58. FIGS. 13 and 14 may be referred to for an indication of a suitable structure defining the canal 58.

It will be observed that irrigation apparatus continuously operating in the land areas will irrigate substantially all portions of the land area. Only four corners of each of the land areas will remain substantially untouched by water supplied by the irrigation systems. In each case, according to the irrigation scheme identified in FIG. 9, there will be two areas of lateral movement shown at L1 and L2 in the uppermost irrigation system and two areas of circular movement shown at C1 and C2. In the areas of lateral movement the irrigation apparatus will be moving as a substantially straight line in substantially normal relationship with the pivot track. At each extremity of the water supply, the system will execute a circular movement, turning about the pivot so as to bring it into alignment with the opposing area of lateral movement L1 or L2. A similar circular movement is executed at the opposite end of the land area and therefore the land area traversed during one operative cycle of the apparatus is of elongated form having arcuate end portions. If conventional circular irrigation systems were utilized to irrigate the same land area, four irrigation systems will be required and the amount of unirrigated surface area would be doubled.

In FIG. 10, there is shown another irrigation scheme showing a rectangular land area being provided with an elongated water supply 62 having a pivot track 64 defined thereby or located in close proximity thereto. In traversing this particular land area, an irrigation system would be first installed along line A-B and the control sequencing means would execute a simple lateral movement tracking the ideal pivot track 64. When the irrigation system reaches line C-D it will shut down automatically and will be towed linearly to a position along line E-C. Whereupon another lateral movement is executed that will bring it to position along line F-A where it will again shut down automatically for towing back to the starting position. In accomplishing total irrigation of a rectangular surface as identified in FIG. 10 there may be provided a power and control unit that tracks back and forth along the ideal pivot track and the major portion of the irrigation system may be connected and disconnected at each extremity of its lateral travel with the direction of the drive mechanisms of the various spans being simply reversed to cause traversing in the opposite direction. Power and control units such as those found in FIGS. 13 and 14 will function effectively in accordance with the scheme depicted in FIG. 10.

With reference now to FIG. 11, an additional irrigation scheme is depicted showing an irrigation system that is designed to reciprocate along the length of a water supply 66 between points A and B. A power and control unit may be located on either side of or straddling the water supply and a number of irrigation spans may be connected to the power and control unit and may extend outwardly toward the sides of the surface area to be irrigated. Mobile bases 70 and 72 at each extremity of the plurality of interconnected spans of the irrigation system may each be individually controllable in accordance with the control sequence that is necessary for maintaining accurate tracking of the system. The irrigation system will simply oscillate back and forth between points A and B, reversing itself automatically at points A and B, thus irrigating all of the rectangular land area while unattended. Obviously, the power and control unit 68 as shown in FIG. 11 may actually comprise a pair of individual power and control units disposed on on either side of the water supply 66 and each may operate independently of the other in order to accomplish irrigation of the elongated rectangular land area. It may be desirable to start irrigation operations with the systems located at opposite extremities of the water supply 66 in order that sufficient water will be available at all times to provide an adequate supply for each of the irrigation systems.

In FIG. 12, there is illustrated a power and control system that may be effectively employed for irrigation operations under the spirit and scope of the present invention. Reference characters that are identical in FIGS. 2 and 12 relate to identical structure. The pivot framework 12 provides a support for power, pump and control structure 74 that may include any suitable type of engine or motor such as electrically driven, gasoline driven, etc. that may drive a water pump and also may drive a generator for providing electrical power. Alternatively, a power source may be provided along the pivot track defining rail 34 and may supply electrical power to an electrical motor for driving the pump in addition to providing power for the control circuitry. An outlet conduit 76 may be connected to the pump and may have a swivel connection 78 that establishes connection with the water distribution conduit that extends along the several interconnected spans of the irrigation system. A water suction conduit 82 may also be connected to the pump structure and may be provided with a suction head 84 that travels within a water supply canal 86 as the irrigation apparatus is driven along by electric drive motors 88 and 90.

As shown in FIG. 12, the ideal pivot track is defined by an elongated guide rail 34 that may be supported by posts 35. Obviously, the side wall 92 of the irrigation canal structure 86 may serve effectively as a guide surface and may define the ideal pivot track that is sensed by the irrigation apparatus during irrigation operations.

To the control portion of the power and control unit may be connected suitable sensing apparatus for detecting the position of the pivotal framework 12 relative to the guide rail 34. This structure is generally referred to at 36 as sensing apparatus but may take the specific form of an arm 94 extending from the power and control unit and supporting a linearly displacement sensor 50 that measures the effective distance of the structural framework relative to the guide rail 44. Also supported by the arm structure 94 is a tracking device 42 having rollers 44 that engage a guide surface of the rail. Angular sensor 38 is provided at the juncture between the tracking device and the arm 94 in order to measure the angular relationship between the tracking device and the arm. If desired, a second angular sensor device 40 may be located above the swivel structure 78 in order that the angular relationship between the water supply conduit and the structural framework 12 may be provided to the control circuitry in the form of an electrical signal.

The pivot device, including the pivot framework and the power and control unit, will track along the guide rail 34 and the irrigation system including several spans extending from the power and control unit will traverse an area to be irrigated in substantially lateral form. if for any reason whatever the angular relationship between the irrigation system and the guide rails should become misaligned or if the power and control unit becomes sufficiently displaced linearly from the position of the guide rail the angular sensors and the linear displacement sensor will provide appropriate electrical signals that are fed to the control system. The control system then puts out controlling signals that induce appropriate energization and deenergization to the various drive motors of the power and control unit and the various spans or towers of the irrigation system, thereby causing the system to be steered in such manner as to bring it back to proper orientation relative to the guide rail 34. Although misalignment may occur during operation of the apparatus, it should be borne in mind that effective misalignment will also occur when the guide rail curves away from the lateral track of the irrigation system. When this occurs, signals will be transmitted to the control unit in the same manner as if the irrigation apparatus itself had become misaligned during movement and appropriate corrective controls will be issued causing the machine to become steered toward a proper relationship with the reference provided by the guide rail.

It should be borne in mind that the power and control unit of the irrigation apparatus may be self-powered through utilization of a mechanical engine that drives a generator and produces electrical current for control purposes, or in the alternative, electrical power may be supplied through or in conjunction with the reference or guide rail and the entire irrigation apparatus may be driven by externally supplied electrical current.

In FIG. 13 there is depicted a power and control unit having a pivot support framework that moves on guide rails relative to a water supply in the form of an elongated ditch with a pivot being movably supported on the pivot support framework. An elongated ditch 94 may be provided that may be at least partially embedded in the surface area to be irrigated and a pair of rails 94 and 96 may be disposed in generally parallel relation with the rails and may receive support wheels 98 and 100, respectively, that may be driven by electric motors 102 and 104. The pivot framework, illustrated generally at 106, may include a support base 108 to which the motors 102 and 104 may be connected. A movable framework 110 may be supported by roller devices 112 and 114 on the support framework 108 in guideways that allow the pivot framework 110 to reciprocate within limits defined by limit switches 116 and 118.

An engine generator and pump unit 120 may be supported on the pivot support structure 110 with the suction conduit 122 of the pump being received within the water supply ditch. The pump discharge conduit 124 may extend upwardly from the pump structure in the form of a stationary pipe that is connected to a rotatable pipe coupling 126 having its outlet connected to the inlet of a water distribution conduit 128 that forms the first section of a plurality of pipe sections supported by each of the various spans of the irrigation system.

For purpose of steering control, the engine generator and pump unit 120 may also include appropriate control circuitry to receive signals from the linear displacement sensor X, from limit switches 116 and 118 and from a collector ring and angular sensor device 130.

As the irrigation system is driven laterally, forces of the irrigation system will be developed that may move the pivot framework structure 110 to the left or to the right as illustrated in FIG. 13. In either case the linear displacement sensor X will sense the degree of displacement of the pivot framework structure 110 relative to the ideal position of said structure. The linear displacement sensor X is a sensing device attached to the pivot framework structure and designed such as to sense displacement of said structure relative to the support base 108. As the linear displacement sensor X senses a displacement an appropriate steering will take place to bring the pivot framework structure 110 back toward its ideal position. This steering action will not only depend on the signal from the linear displacement sensor but rather on the processed signals from said sensor and from the collector ring and angular sensor 130.

An excessive linear displacement of the pivot framework structure 110 relative to the support structure 108 will be detected by limit switch 116 or by limit switch 118. The system will shut down as either one of limit switches 116 and 118 is operated as this is a necessary safety shut down. During proper operation neither one of the limit switches 116 and 118 will be transferred. These switches are only for backup safety shut down in case of a malfunction in the main control functions based on the control signals from the linear displacement sensor X and the angular sensor 130. The angular sensor 130 will detect any angular displacement of the irrigation system relative to the direction of the water supply and the tracks and, through the control circuitry, will induce appropriate movement of one extremity of the irrigation apparatus relative to the other so as to cause sufficient pivoting to bring the irrigation system back toward its properly aligned relationship relative to the guide rails 94 and 96. Power supply and control for the irrigation system of FIG. 13 is of the same nature as discussed above in connection with FIG. 12.

In FIG. 14 there is illustrated a modified embodiment of the present invention, wherein a water supply is provided in the form of an elongated ditch 132 into which a suction pipe 134 extends in order to supply the pump portion of the engine generator and pump unit 136 with an adequate supply of water. A single guide rails 138 may be located in generally parallel relation with the water supply ditch 132 and may receive a drive wheel 140 that is driven by motor 142. On the opposite side of the pivotal framework 144 a motor 146 may be connected that imparts driving rotation to a drive wheel 148 that may have a pneumatic tire. The discharge conduit 150 of the pump unit may be in the form of a stationary generally vertically oriented pipe 150 that is connected to a rotating pipe coupling 152 having the usual flexible connection with a water distribution conduit 154. A collector ring and angular sensing unit 156 may be secured to the rotatable coupling 152 and, through an appropriate system cable 158, may supply electrical current for operation of the various motors of the mobile bases of each of the various spans of the irrigation system.

Angular misalignment of the irrigation system relative to the pivotal framework 144 may of course be measured by the angular sensing unit 156 and appropriate signals may be transmitted to the control facility for achieving correction in tracking of the irrigation system. Linear displacement of the irrigation system may be measured by means of a linear displacement sensor 160 having an interconnection with a telescopically movable section of the first span of irrigation pipe. The pivot framework therefore may move in a straight line under guidance of the rail 138 even though both angular and linear displacement may be taking place. The telescoping connection in the pipe section 154 will effectively accommodate linear displacement without causing any shifting whatever of the pivot framework relative to the water supply canal 132.

In view of the foregoing it is apparent that there has been provided a unique method and apparatus for accomplishing irrigation of large land areas wherein irrigation apparatus is employed that is not tethered to a physical structure, but rather is steerable over the land area within limits bounded by allowable error boundaries defined along an ideal intended track. Through utilization of irrigation apparatus in accordance with the present invention, it is practical to accomplish irrigation of a greater percentage of the land that is within a particular rectangular track than is typical. Moreover, it is not necessary to provide specific guideways for each of the various movable towers of the irrigation system in order to control lateral movement of the system over a particular land area. By appropriate control the irrigation system of the present invention can be caused to move laterally and to pivot in such manner that it will automatically track along a guide structure that is not straight or is irregularly curved. Accordingly, the present invention is well adapted to attain all of the objects and advantages hereinabove set forth together with other advantages that will become obvious and inherent from a description of the apparatus itself. It will be understood that certain combinations and subcombinations are of utility and may be employed without reference to other features and subcombinations. This is contemplated by and is within the spirit and scope of the present invention.

What is claimed is:

1. A method of irrigating a land area having an elongated reference through the use of an elongated irrigation system having reference sensing means, said method comprising:

locating one extremity of the irrigation system in close proximity of said elongated reference and placing said reference sensing means in sensing relationship with said elongated reference;

placing said elongated irrigation system in communication with said supply of water;

energizing said irrigation system to cause movement of the said irrigation system on said land area with each extremity of said irrigation system moving at substantially the same speed;

detecting any linear displacement and angular misalignment of said irrigation system relative to said reference;

correcting linear displacement and angular misalignment that is beyond acceptable limits by alternate end movement causing one of the extremities of said irrigation system to move at a rate differing from the rate of movement of the opposite extremity of said irrigation system and then causing the other extremity of said irrigation to move at a rate differing from the rate of movement of said one extremity, causing the irrigation system to perform a turning movement that is designed to steer said reference sensing means toward a predetermined relationship with said elongated reference; and causing both of the extremities of said irrigation system to resume movement at substantially the same rate of movement until such time as movement of said irrigation system is such as to move said reference sensing means out of said predetermined relationship with said elongated reference.

2. A method of irrigating a land area as recited in claim 1, wherein said correcting of said linear displacement and angular misalignment is accomplished by:
alternate incremental turning of said irrigation system about the extremities thereof, each of the increments of turning bringing the sensing means of said irrigation system toward said predetermined relationship with said elongated reference.

3. A method of irrigating a land area as recited in claim 2, wherein:
said included angle of said increments of arcuate movement decrease with each increment of arcuate movement until such time as a final increment or arcuate movement brings said sensing means to said predetermined relationship with said elongated reference.

4. A method of irrigating a land area as recited in claim 1, wherein said irrigation system includes a position reference and said sensing means includes a linear displacement sensor for determining linear displacement of said position reference from said elongated reference and an angular sensor for measuring any angular misalignment of said position reference relative to said elongated reference and said method includes:
measuring said linear displacement and angular misalignment;
computing the amount of alternate end movement that is necessary for movement of said sensing means to said predetermined relationship with said elongated reference;
executing said alternate end movement of said irrigation system;
measuring said linear displacement and angular misalignment following execution of said alternate end movement;
computing the amount of alternate end movement that is necessary to accomplish movement of said sensing means toward said predetermined relationship with said elongated reference;
executing said alternate end movement in repetitive manner until the position of said sensing means is within predetermined limits relative to said elongated reference; and
moving said irrigation system laterally as long as said sensing means remains within said predetermined limits.

5. A method of causing tracking movement of an elongated irrigation system that is adapted for substantially lateral movement over the surface of a land area to be irrigated, which land area is provided with an elongated reference, a water supply and wherein a first extremity of said irrigation system is provided with sensing apparatus for measuring angular misalignment and linear displacement thereof from said elongated reference and said first extremity and a second extremity of said irrigation system are adapted for independent movement and intermediate portions of said irrigation system move responsive to angular relationships thereof relative to adjacent sections of said irrigation system, said method comprising:
establishing communication of said irrigation system with said water supply;
continuously moving said irrigation system in lateral manner;
continuously measuring linear displacement of said sensing apparatus from said elongated reference;
continuously measuring angular misalignment of said sensing apparatus relative to said elongated reference;
executing a tracking correction movement with said irrigation system when either said linear displacement and angular misalignment are positioned beyond acceptable limits relative to said elongated reference, said tracking correction movement being accomplished by alternately moving one of the extremities of said irrigation system at a faster rate of speed as compared to the rate of movement of the opposite extremity thereof and then moving the opposite extremity of said irrigation system at a faster rate of speed as compared to the rate of speed of said one extremity to achieve controlled turning of said irrigation system; and
resuming lateral movement of said irrigation system upon termination of said tracking correction movement.

6. A method of causing tracking movement of an elongated irrigation system as recited in claim 5, wherein lateral movement of said irrigation system is accomplished by:
moving the extremities of said irrigation system at substantially the same speed.

7. A method of causing tracking movement of an elongated irrigation system as recited in claim 5, wherein:
said tracking correction is accomplished by variable sequential movement of the extremities of said elongated irrigation system accomplishing multiple step correction to bring the sensing apparatus into proper relationship with said elongated reference.

8. A method of causing tracking movement of an elongated irrigation system as recited in claim 5, wherein said tracking correction movement is accomplished by:
pivotal movement of the irrigation system about each of the extremities of the irrigation system in alternating manner with the angle of each pivotal movement being substantially identical.

9. A method of causing tracking movement of an elongated irrigation system as recited in claim 5, wherein said tracking correction movement is accomplished by:
pivvotal movement of the irrigation system about each of the extremities of the irrigation system in alternating manner with the angle of each pivotal movement being successively less as corrective movements cause said irrigation system to approach a predetermined relationship with said elongated reference.

10. A method of causing tracking movement of an elongated irrigation system as recited in claim 5, wherein said water supply is of elongated configuration and said land area to be irrigated is of closed circuit configuration with said water supply being substantially centered within said land area and said elongated reference being disposed in equidistantly spaced relationship with said elongated water supply and wherein said method includes:
moving said irrigation system in substantially lateral manner along the length of said water supply and on each side of said water supply with said tracking corrections being made automatically to maintain a predetermined relationship of said irrigation system to said elongated reference; and causing arcuate turning of said irrigation system at each extremity of said elongated reference, said irrigation system maintaining communication with said water supply and continuously distributing water on said land area during continuous circulation thereof about said water supply.

11. A method of causing tracking movement of an elongated irrigation system as recited in claim 5, wherein said water supply is of elongated configuration and said land area to be irrigated is of generally rectangular configuration with said water supply being located intermediate the width of the land area and running substantially along the length of the land area and said elongated reference is positioned in generally equidistantly spaced relation with said water supply, said irrigation system being communicated intermediate the extremities thereof with said water supply with the extremities of said irrigation system being in close proximity to the edges of said land area, said method including:
  causing reciprocation of said irrigation system along the length of said water supply with reversing movement of said irrigation system occurring automatically at each extremity of said water supply;
  causing independent movement of each extremity of said irrigation system responsive to control signals of said sensing apparatus to maintain substantially lateral movement of portions of said irrigation located on either side of said water supply; and
  causing corrective movement of each extremity of said irrigation system as required to maintain said substantially lateral movement.

12. Apparatus for irrigating land areas, said apparatus comprising:
  an elongated water supply being located on said land area;
  an elongated reference being located on said land area;
  an elongated irrigation system adapted for substantially continuous movement in generally lateral manner over said land area said lateral movement being executed by movement of each extremity of said irrigation at substantially the same speed;
  means communicating said irrigation system with said elongated water supply and supplying water under pressure to said irrigation system;
  sensing means being connected to said irrigation system and being capable of measuring linear displacement and angular misalignment of said irrigation system relative to said elongated reference; and
  control means being provided for said irrigation system and receiving linear displacement and angular misalignment signals from said sensing means, said control means, responsive to said signals causing changes in the relative speed of movement of each extremity of said irrigation system when the position of said irrigation system relative to said elongated reference is detected by said sensing means to be beyond acceptable limits, causing said irrigation system to automatically execute a steering movement that brings its direction of movement toward a predetermined relationship with said elongated reference.

13. Apparatus as recited in claim 12, wherein:
said elongated reference is in the form of a guide rail supported above the surface of the land area; and said sensing means comprises at least a pair of sensors that continuously engage said guide rail as the irrigation system is moved, said sensors establishing a reference line and an angular measuring device that measures the angular orientation of the reference line to a specific portion of said irrigation system and transmits said angular orientation to said control means in the form of electrical signals.

14. Apparatus as recited in claim 13, wherein said sensing means comprises:
  position measurement structure being supported by said irrigation system;
  said sensors being contact elements supported by said position measurement structure with said contact elements each being in continuous movable engagement with said guide rail during movement of said irrigation system relative to said guide rail;
  linear displacement sensor means being connected to said position measurement structure and allowing relative movement of said position measurement structure relative to said irrigation system to take place without causing movement of said sensors out of contact with said guide rail, said linear displacement sensor means measuring such linear displacement of said irrigation system relative to said elongated reference and transmitting electrical signals to said control means reflecting linear displacement; and
  said control means generating a correcting control command when the electrical signals of either of said linear displacement and angular misalignment sensors is beyond a predetermined acceptable value.

15. Apparatus as recited in claim 12, including:
  a power and control unit for supplying operating power for operation of said irrigation system, said power and control unit being disposed in close proximity to said elongated reference;
  a plurality of irrigation spans being connected in series with one another and at least one of said spans being interconnected with said power and control unit;
  drive means being provided for each of said irrigation spans and for said power and control unit for propelling said irrigation apparatus over the land area to be irrigated;
  means for controlling driving of the drive means of each of the interior spans of said irrigation system responsive to the angular relationship of each of said spans to adjacent spans of said irrigation system;
  end drive means at each extremity of said irrigation system being individually controllable; and
  said control means transmitting command signals to said end drive means and causing variation in the relative operating speed of said end drive means, causing automatically controlled turning of said irrigation system.

16. Apparatus as recited in claim 15, wherein:
said power and control unit is positioned on one side of said water supply and is driven over the land area in close proximity to said water supply, said power and control unit defining one extremity of said elongated irrigation system.

17. Apparatus as recited in claim 15, wherein:

said power and control unit is located in straddling relation to said water supply and reciprocates along the length of said water supply;

water supply conduit means is connected to said power and control unit and is located in communication with said water supply;

said spans of said irrigation system are connected on either side of said irrigation system and are adapted for substantially lateral movement over the land area; and each section of said elongated irrigation system on either side of said power and control unit is adapted for turning movement relative to said power and control unit in order to accomplish self steering of said elongated irrigation system as it moves over the land area.

18. Apparatus as recited in claim 12, including a power and control unit defining one extremity of said elongated irrigation system, said power and control unit comprising:

a structural framework;

means for propelling said structural framework over the land area to be irrigated;

means for propelling said elongated irrigation system over said land area, including a terminal propelling device;

one portion of said structural framework defining a reference structure;

said sensing means being supported at least in part by said structural framework with at least a portion of said sensing means located specifically relative to said reference structure;

angular sensing means defining a part of said sensing means and measuring the angular relationship of said reference structure of said structural framework relative to said elongated reference and providing such angular relationship in the form of electrical signals;

linear displacement sensing means also defining a part of said sensing means and measuring the linear displacement of said reference structure of said structural framework relative to said elongated reference; and control means being provided on said power and control unit and receiving said linear displacement and angular misalignment signals, said control means responsive to detection of signals indicating either linear displacement and angular misalignment to be beyond acceptable limits, transmitting turning command signals to said means for propelling said structural framework and said terminal propelling device, causing the relative speed of said structural framework and said terminal propelling device to become changed to cause execution of said steering movement.

19. Apparatus as recited in claim 18, wherein said steering movement comprises:

causing selective cessation of the movement of said power and control unit and said terminal propelling device while continuing movement at the opposite extremity of said irrigation system causing pivotal movement of said irrigation system about an extremity thereof.

20. Apparatus as recited in claim 18, wherein said steering movement comprises:

causing selective change of speed of said power and control unit and said terminal propelling device to cause turning movement of said irrigation system about pivot points located remotely from said elongated irrigation system.

* * * * *

UNITED STATES PATENT OFFICE
CERTIFICATE OF CORRECTION

Patent No. 3,974,845           Dated August 17, 1976

Inventor(s) Harald Indresaeter

It is certified that error appears in the above-identified patent and that said Letters Patent are hereby corrected as shown below:

In the Specification:

Column  2, line 31, "rerlative" should be -- relative --;
Column  2, line 51, delete "and" following "system";
Column  3, line 29, following "to" . insert -- an --;
Column  3, line 41, "detection" should be -- detected --;
Column  5, line 54, "funnction" should be -- function --;
Column  6, line 30, "angualr" should be -- anoular --:
Column  8, line 60, following "is", second occurrence delete "a"
Column  9, line  4, following "is", insert -- much --;
Column  9, line 57, "exagerated" should be -- exaggerated --;
Column 13, line 35, "point" should be -- pivot --;
Column 13, line 43, "point" should be  -- portion
Column 14, line 52, "exagerated" should be -- exaggerated --;
Column 15, line 16, "period" should be -- periods --;
Column 15, line 42, "difference" should be -- distance --;
Column 16, line 35, "piont" should be -- point --;
Column 16, line 39, "exagerated" should be -- exaggerated --;
Column 16, line 52, following "track", add -- and --;
Column 17, line 56, "acutal" should be -- actual --;
Column 17, line 61, "acutal" should be -- actual --;
Column 19, line 38, "angular" should be -- angularly;
Column 19, line 48, "area" should be -- areas --;
Column 20, line 25, "area" should be -- areas --;
Column 21, line  4, "on on" should be -- one on --;
Column 22, line 24, "electrical" should be -- electric --;
Column 23, line 25, "displacement" should be -- misalignment --;
Column 23, line 42, "rails" should be -- rail --.

In the Claims:

Claim 1, Column 24, line 59, following "irrigation", add -- system --.
Claim 9, Column 26, line 47, "pivotol" should be -- pivotal --.

Signed and Sealed this

Twenty-fifth Day of January 1977

[SEAL]

Attest:

RUTH C. MASON
Attesting Officer

C. MARSHALL DANN
Commissioner of Patents and Trademarks